United States Patent [19]
Peterson

[11] 3,831,527
[45] Aug. 27, 1974

[54] PASSENGER CAR SWITCHING DEVICE

[75] Inventor: William Hartin Peterson, Homewood, Ill.

[73] Assignee: Pullman Incorporated, Chicago, Ill.

[22] Filed: May 18, 1973

[21] Appl. No.: 361,676

[52] U.S. Cl. ............................ 104/130, 105/215 R
[51] Int. Cl. .......................................... E01b 25/12
[58] Field of Search ........... 104/130, 246, 242, 243, 104/245, 247; 105/215 R

[56] References Cited
UNITED STATES PATENTS

| | | | |
|---|---|---|---|
| 3,363,584 | 1/1968 | Brush et al. ........................... | 104/247 |
| 3,391,652 | 7/1968 | Lauber ................................. | 104/247 |
| 3,393,762 | 7/1968 | Matson .............................. | 104/247 X |
| 3,712,238 | 1/1973 | Colovas et al. ....................... | 104/130 |

*Primary Examiner*—M. Henson Wood, Jr.
*Assistant Examiner*—Richard A. Bertsch
*Attorney, Agent, or Firm*—Hilmond O. Vogel

[57] ABSTRACT

A vehicle mounted switching arrangement for use in a static switching track structure having no moving track sections whereby the passenger vehicle is moved laterally by engagement of the car mounted rail grabbing device to permit the flange of the wheel opposite the actuated rail engaging device to be spaced a short distance from the supporting rail. After the lateral movement of the vehicle the car is in position to move into a switch track which is positioned in the space between the wheel flange and main supporting rail. This switch track then permits the passenger vehicle to be switched off the main line and through a curved section into a second switch track. The rail grabbing mechanism which is mounted on the passenger vehicle includes an interconnected rail grabbing device on each side of the vehicle which permit only one rail grabbing arm to engage a track at a time.

3 Claims, 5 Drawing Figures

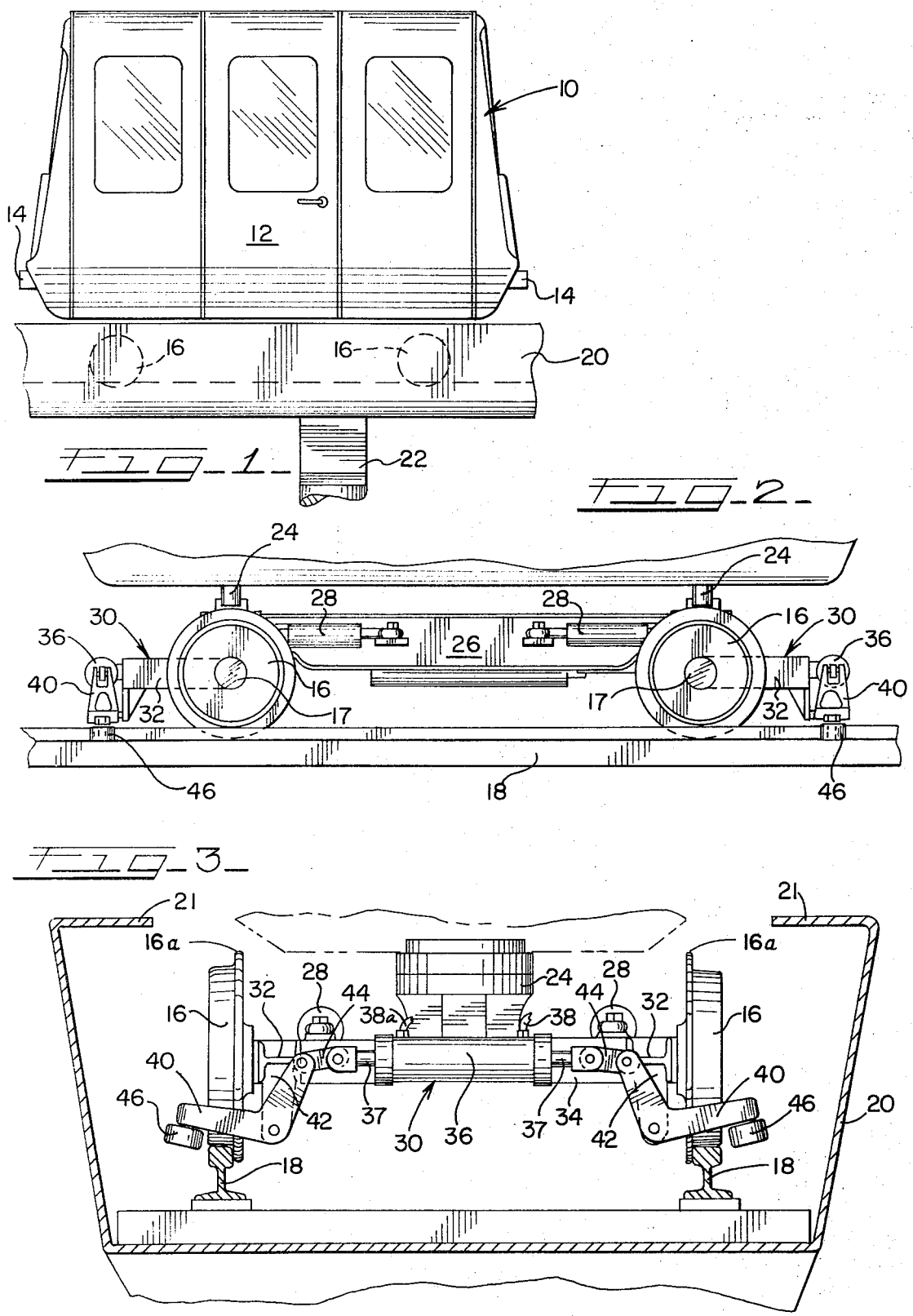

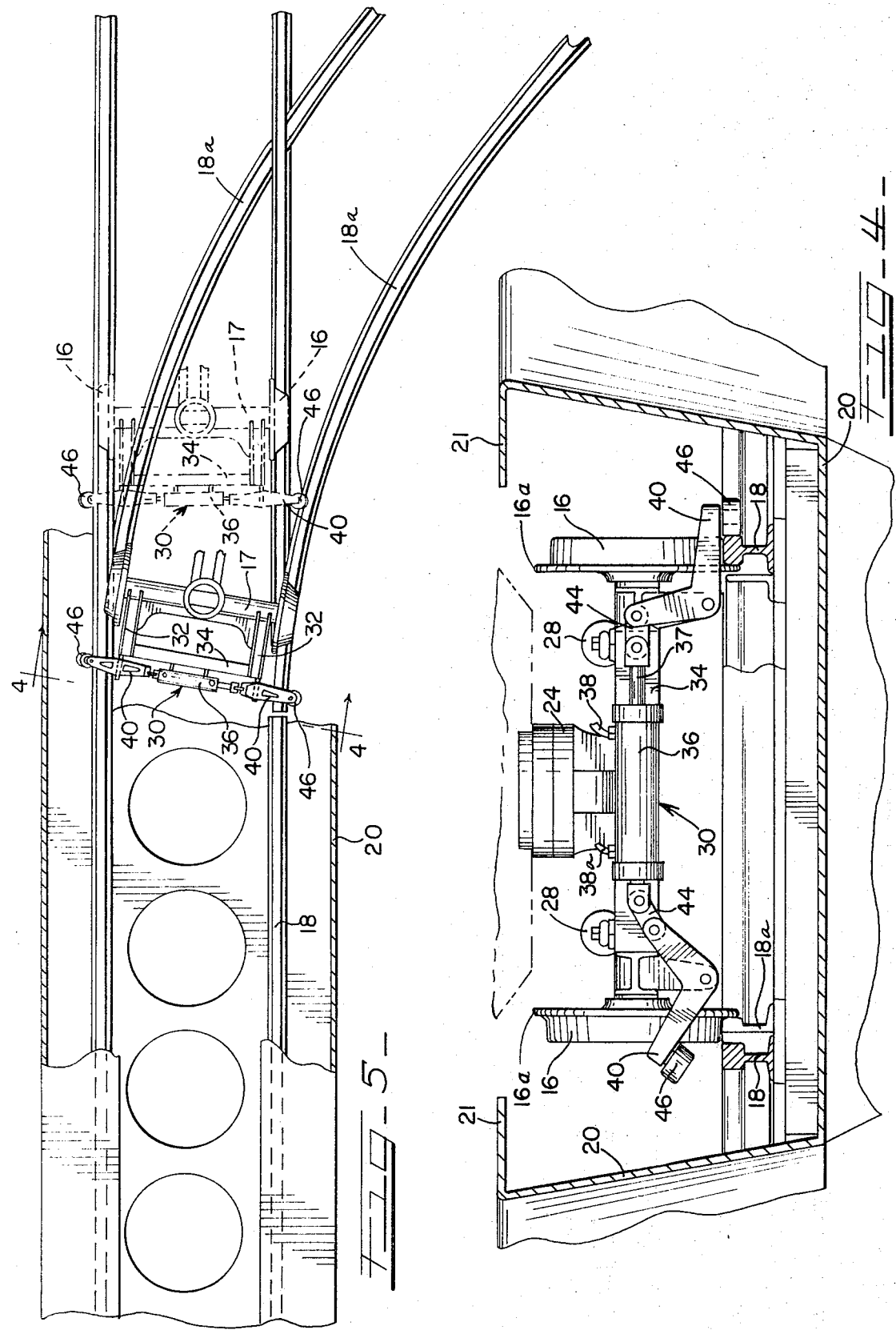

PASSENGER CAR SWITCHING DEVICE

BACKGROUND OF THE INVENTION

1. Field of the Invention

This invention relates to railway passenger vehicles and in particular those vehicles riding on track means having a static switching arrangement.

2. Description of the Prior Art

Prior art static switching arrangements have generally required a specialized wheel design or a modified car supporting track or roadway to allow for the switching arrangement. The present invention is adapted for use in conventional railway track and wheel structures without requiring extensive modifications to the track structure or the car supporting wheels.

SUMMARY

The present invention pertains to a static switching arrangement for use with a passenger carrying vehicle and in particular to a railway type of vehicle supported on conventional railway tracks and utilizing conventional railway flanged wheels. Vehicle mounted rail engaging members engage the car supporting track on the side of the vehicle in the direction of a desired turn and thereby move the vehicle laterally into an area on the track in which a switch track may engage the wheels on the opposite side of the vehicle and permit the vehicle to move from a through track onto a switch portion. The rail grabbing mechanism includes a double acting piston device which interconnects the rail grabbing arms on each side of the vehicle thereby providing a safety feature of preventing engagement by the rails of both rail grabbing arms simultaneously. When one rail engaging arm is down and engaging a rail the mechanism will lift the rail engaging arm on the other side of the vehicle. The rail grabbing device of the present invention also can be utilized during high speed turns where additional rail engaging capabilities are desired to stabilize the vehicle on the track. This additional feature also diminishes the need for severely banked curves which are traditionally required where high speeds are encountered during short radius curves.

It is an object of the present invention to provide a railway type of passenger vehicle adapted for switching on a static switching arrangement whereby all portions of the track are permanently attached.

It is another object of the present invention to provide a passenger vehicle having a vehicle mounted rail grabbing mechanism which may be actuated from on board or trackside signaling devices to thereby switch the vehicle from main line to branch lines as desired.

It is yet another object of the present invention to provide a vehicle mounted switching arrangement positioned outwardly of each set of car wheels to thereby initiate axle turning.

Also it is contemplated with the present invention that the front and rear rail grabbing mechanism will be operable only when the car is traveling in the direction which positions the respective rail grabbing mechanism ahead of the leading wheel.

These and other objects of the invention will become apparent from reference to the following description, attached drawings and appended claims.

BRIEF DESCRIPTION OF THE DRAWINGS

FIG. 1 is a side elevational view of the passenger vehicle employing the switching mechanism of the present invention;

FIG. 2 is a side elevational view of the under-carriage and wheel structure of vehicle illustrated in FIG. 1;

FIG. 3 is an end view of the vehicle portion illustrated in FIG. 2;

FIG. 4 is a section view taken along line 4—4 of FIG. 5 of the vehicle under-carriage and truck arrangement showing in particular the rail grabbing mechanism; and FIG. 5 is a top plan view of a switch track junction which is used with the mechanism of the present invention.

DESCRIPTION OF THE PREFERRED EMBODIMENT

In the drawings, 10 designates a passenger car or people mover which is essentially a low volume railway type vehicle used to transport a relatively small number of passengers, for example, between metropolitan areas and airports or metropolitan areas and college campuses. These vehicles are generally intended to accommodate from eight to 15 passengers and thereby provide low cost convenience and low maintenance transportation between designated frequently traveled stations. The passenger car 10 has a door 12 which is intended to be a hinged structure which is convenient to operate and reliable in securing the vehicle in a closed condition during passenger transport. Coupler units 14 are positioned at each end of the vehicle 10 and may be used to connect with other cars to form a train, or the passenger car may operate as a single unit. Supporting the passenger car body are a pair of wheels 16 having flanges 16a and positioned at each end of the vehicle and interconnected by transversely extending axle members 17. Railway type of tracks or rails 18 are used to guide and provide a supporting surface for the car 10. As indicated in FIG. 5, the curved switch track portion 18a may intersect the mainline track portions 18 and provide a switching point for directing the car 10 from the main line onto a branch track portion. A track housing 20 surrounds the track bed and extends upwardly therefrom terminating with the horizontally extending top flange portions 21 to thereby provide a sound deadening enclosure which will reduce the ambient noise level during car movement. The entire track assembly, track bed and rail housing 20 may be supported on the trestle columns 22 which raise the track structure above the ground thereby providing an overhead transportation system which calls for a minimum interference with land use and land planning.

A bolster spring and center plate assembly 24 which is a resilient shock absorbing member intended to cushion shocks caused by irregularities in track structure or track bed is the connecting member between the vehicle underframe 26 and the passenger car body. The bolster spring assembly 24 is positioned above the axle 17 and fixedly connected thereto by suitable fastening and reinforcing members. Each axle is movable about the spring assembly 24 for ease of vehicle cornering.

As illustrated in FIG. 2, damper and centering spring members 28 extend inwardly of the vehicle from the transversely extending axles 17 and connect the axles with the longitudinally extending underframe member or center sill 26 to provide a dampening and a stabilizing steering force for guiding the vehicle along the support rails. In the event the axles 17 were fixed the dampening members 28 would not be required.

The switching mechanism of the present invention is designated generally by the numeral 30 and illustrated in FIGS. 3 and 4 showing both in the neutral or nonoperative position and in the operative position.

As noticed in FIG. 5, the switching assembly 30 includes a pair of spaced cantilever beams 32 which extend outwardly of the vehicle from the axle 17 and are interconnected by the cross member 34, thereby forming a closed box extending from each axle 17. Fixedly attached to the cross member 34 is a double acting hydraulic actuating cylinder 36 including the usual drive or piston rods 37 extending outwardly therefrom and being connected to a reciprocable piston which is not shown. The hydraulic lines 38, 38a are used to feed hydraulic fluid into the cylinder and thereby drive the piston and the associated piston rods.

Operatively connected to each piston rod 37 is a bell crank assembly 40 hanging from a support bracket 42 which extends downwardly from the cantilever beam members 32. Connecting links 44 attach the bell cranks 40 to the associated drive rods 37 thereby allowing for transfer of the reciprocating linear movement of the drive rods into rotating movement of the bell cranks 40.

Each bell crank 40 includes a roller member 46 attached to the outer portion of the lower arm and positioned for rotatable movement when engaging an associated rail 18. These rollers are so positioned to engage the vertical outside flange of the rail head thereby urging the flange 16a of the adjacent wheel into a locked contacting relationship with the supporting rail.

THE OPERATION

The operation of the switching arrangement of the present invention will be described with reference to the track structure of FIG. 5 and discussed with reference to a people mover vehicle moving from the straight main track portions 18 onto the switch track section 18a, that is, from left to right as viewed in FIG. 5. The car portions illustrated in FIG. 5 denote the trailing axle of the vehicle. During car movement along the straight track portions 18 the rail grabbing mechanism 30 is in the neutral position illustrated in FIG. 3. When it is desired, for example, to turn onto the switch track on the curved rail sections 18a the lower rail grabbing bell crank 40 illustrated in FIG. 5 would be lowered by the actuating cylinder 36 and engage the side of the railhead 18. This engagement would lock the associated wheel 16 onto the supporting rail 18 and also provide guiding forces for directing the car onto the curved track portion 18a the lower rail grabbing bell crank 40 illustrated in FIG. 5 would be lowered by the actuating cylinder 36 and engage the side of the rail head 18. This engagement would lock the associated wheel 16 onto the supporting rail 18 and also provide guiding forces for directing the car onto the curved track portion 18a and into the position illustrated by the solid line drawing of FIG. 5.

On the other hand, should no switching be desired the mechanism would remain in the neutral position illustrated in FIG. 3 and continue along the straight track portion 18 into the position illustrated by the drawing in phantom shown in FIG. 5. For complete safety the rail engaging roller 46 at the top of the drawing of FIG. 5 may be lowered to grab its associated rail 18 to insure no switching occurs.

Thus it will be noticed when it is desired to move the passenger vehicle 10 along a switch track requiring a turn in a right direction relative to the direction of movement of the vehicle, the rail grabbing devices on the right side of the car will be lowered to engage the rail associated therewith and thereby provide a guide means for directing passenger vehicle from the main line and into a right turn on a switch track. Conversely, the opposite would occur for a turn to the left to be negotiated on a left switch track. As mentioned earlier, if no switching is desired the switching mechanism 30 may be left in the neutral position.

A safety feature of the present invention is provided by the interconnecting cylinder which is attached to both bell cranks thereby permitting only one bell crank to be lowered at a time, thus eliminating the danger of both rail grabbing bell cranks being actuated simultaneously should a faulty signal be given. Also, as mentioned earlier, the rail grabbing devices of the present invention are contemplated as being positioned at each end of the passenger vehicle 10. However, it is not necessary that both sets of rail grabbing devices be actuated for it has been found that only the leading mechanism which is ahead of the axle in the direction of movement need be actuated to provide adequate guide means when a turn is desired.

Thus it has been shown that the people mover of the present invention has provided a novel vehicle carried switching arrangement which permits the use of the vehicle 10 with a static switching arrangement thereby lowering maintenance cost and increasing safety by the elimination of moving switch tracks. The switching mechanism provides further safety means by the interconnection provided by the hydraulic cylinder 36 which has a common drive rod interconnecting the spaced rail grabbing bell crank members 40.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A railway vehicle with a body to carry passengers and having flanged wheels adapted to run on rails having static switching junctions, said vehicle having a switching apparatus carried by a supporting wheel and axle assembly, the improvement comprising:

a cantilever support member extending longitudinally outwardly of the vehicle and fixedly attached to said associated wheel and axle assembly and providing mounting and support means for the vehicle switching apparatus;

said vehicle switching apparatus having an operating cylinder means mounted centrally of the vehicle and including laterally reciprocable drive piston rod means;

a pair of rail engaging bell crank means each depending from said cantilever support member and having a downwardly extending rail engaging portion and including a connecting link for attachment with said operating cylinder drive piston rod thereby converting horizontal reciprocal movement of said drive rod into rotation of the bell crank and accompanying raising and lowering of the rail engaging portion of the bell crank means;

said supporting wheel and axle assembly including a body connecting center plate bolster assembly allowing independent vehicle steering movement of said wheel and axle assembly;

said body having a continuous center sill extending the length of said vehicle body; and centering and dampening spring means attached to said center sill and having axle connecting portions extending diagonally outwardly from said center sill and being attached to said associated wheel and axle assembly.

2. A railway vehicle with a body to carry passengers and having flanged wheels adapted to run on rails having static switching junctions, said vehicle having a switching apparatus carried by a supporting wheel and axle assembly, the improvement comprising:

a cantilever support member extending longitudinally outwardly of the vehicle and fixedly attached to said associated wheel and axle assembly and providing mounting and support means for the vehicle switching apparatus;

said vehicle switching apparatus having an operating cylinder means mounted centrally of the vehicle and including laterally reciprocable drive piston rod means;

a pair of rail engaging bell crank means each having a downwardly extending rail engaging portion and including a connecting link for attachment with said operating cylinder drive piston rod thereby converting horizontal reciprocal movement of said drive rod into rotation of the bell crank and accompanying raising and lowering of the rail engaging portion of the bell crank means;

hanger support brackets depending down from the cantilever support members and providing mounting means for the bell crank means; and said operating cylinder means including a double acting cylinder having a continuous piston rod operatively connected to each of said rail engaging bell crank means.

3. A railway vehicle with a body to carry passengers and having flanged wheels adapted to run on rails having static switching junctions, said vehicle having a switching apparatus carried by a supporting wheel and axle assembly, the improvement comprising:

a cantilever support member extending longitudinally outwardly of the vehicle and fixedly attached to said associated wheel and axle assembly and providing mounting and support means for the vehicle switching apparatus;

said vehicle switching apparatus having an operating cylinder means mounted centrally of the vehicle and including laterally reciprocable drive piston rod means;

a pair of rail engaging bell crank means each depending from said cantilever support member and having a downwardly extending rail engaging portion and including a connecting link for attachment with said operating cylinder drive piston rod thereby converting horizontal reciprocal movement of said drive rod into rotation of the bell crank and accompanying raising and lowering of the rail engaging portion of the bell crank means;

and an operating cylinder mounting cross member connecting the cantilever support members and forming a rigid enclosed box with said wheel and axle assembly.

* * * * *